United States Patent
Yee et al.

(10) Patent No.: US 11,983,230 B2
(45) Date of Patent: May 14, 2024

(54) SYSTEMS AND METHODS FOR DATA AGGREGATION AND CYCLICAL EVENT PREDICTION

(71) Applicant: Capital One Services, LLC, McLean, VA (US)

(72) Inventors: Bryant Yee, Washington, DC (US); Brian McClanahan, McLean, VA (US); Cruz Vargas, Alexandria, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 485 days.

(21) Appl. No.: 17/392,903

(22) Filed: Aug. 3, 2021

(65) Prior Publication Data
US 2023/0042210 A1    Feb. 9, 2023

(51) Int. Cl.
| | |
|---|---|
| *G06F 16/9535* | (2019.01) |
| *G06F 9/46* | (2006.01) |
| *G06F 16/9032* | (2019.01) |
| *G06F 16/906* | (2019.01) |
| *G06F 18/214* | (2023.01) |
| *G06F 40/211* | (2020.01) |
| *G06N 20/00* | (2019.01) |

(52) U.S. Cl.
CPC .......... *G06F 16/9535* (2019.01); *G06F 9/466* (2013.01); *G06F 16/90332* (2019.01); *G06F 16/906* (2019.01); *G06F 18/214* (2023.01); *G06F 40/211* (2020.01); *G06N 20/00* (2019.01)

(58) Field of Classification Search
CPC .............. G06F 16/9535; G06F 16/906; G06F 16/90332; G06F 40/211; G06F 18/214; G06F 9/466; G06N 20/00
See application file for complete search history.

(56) References Cited

U.S. PATENT DOCUMENTS

| | | | |
|---|---|---|---|
| 8,099,325 | B2 | 1/2012 | Gangadharpalli et al. |
| 8,706,580 | B2 | 4/2014 | Houseworth et al. |
| 10,453,099 | B2 | 10/2019 | Korpusik et al. |
| 10,713,594 | B2 | 7/2020 | Szeto et al. |
| 2014/0244361 | A1 | 8/2014 | Zhang et al. |
| 2015/0269609 | A1 | 9/2015 | Mehanian et al. |
| 2019/0385213 | A1 | 12/2019 | Pande et al. |

*Primary Examiner* — Jay A Morrison
(74) *Attorney, Agent, or Firm* — HUNTON ANDREWS KURTH LLP

(57) ABSTRACT

The present invention relates to an artificial intelligence method and system for event predication, comprising: receiving, user messages, user activity data, event data, user identification information and transaction data; scraping webpages for additional event data; applying a natural language processing module to process the event data; constructing a training data set using the processed event data; constructing user preferences from the user messages, the user activity data, the user identification information and the transaction data; training a predictive model using the training data set to determine at least one upcoming event predictions determining to display the at least one event predictions based on the user profile; if it is determined to display one of the at least one event predictions, generating a graphical user interface display with a calendar depicting the at least one event prediction; and presenting the graphical user interface display to the user.

20 Claims, 7 Drawing Sheets

SYSTEMS AND METHODS FOR DATA AGGREGATION AND CYCLICAL EVENT PREDICTION

FIELD OF THE DISCLOSURE

The present disclosure relates to systems and methods for aggregating data, generating predictions of cyclical events, and selectively presenting generated event predictions based on user preferences.

BACKGROUND

An increasing amounts of electronic data is becoming available, which allows the opportunity to document and research past events. With this information, a better understanding of past events and the cyclical nature of events can be developed.

For example, as the economy and the information available to consumers continues to expand, consumers often seek to strategically purchase products to minimize expense. Many brands and other retailers offer seasonal sales events for their inventory, but many customers are not aware of upcoming events when making purchasing decisions. Consumers therefore may make purchases at inopportune times, such as shortly before a sales event.

These and other deficiencies exist. Accordingly, there is a need to develop methods of aggregating data, generating predictions of cyclical events based on this data, and selectively presenting generated event predictions based on consumer preferences.

SUMMARY OF THE DISCLOSURE

Embodiments of the present disclosure provide an artificial intelligence (AI) system, method, and a non-transitory computer-accessible medium having stored thereon computer-executable instructions for event predications. Exemplary embodiments can include a data storage containing event data, user messages, user activity data, transaction data, and user identification information; a communication interface in data communication with the data storage; an AI engine in data communication with the data storage and coupled to an application programming interface (API) that enables transmission of real time data through the communication interface; and a natural language processing (NLP) module in data communication with the AI engine. The AI engine can be configured to receive, from the data storage, the user identification information, the user messages, the event data, the user activity data, the transaction data, and the user identification information; scrape webpages for additional event data, apply the NLP module to process the event data; construct user preference data 206 from the user messages, user activity data, transaction data, and user identification information; construct a user profile from a plurality of user preference data 206; construct a training data set using the processed event data; train a predictive model using the training data set to determine upcoming event predictions; and determine to display one of the upcoming event predictions based on the user profile. If it is determined to display one of the upcoming event predictions, the AI engine can generate a graphical user interface display with a calendar depicting the one of the determined event predictions; and present the graphical user interface display to the user.

Further exemplary embodiments include that the user messages contain at least one selected from the group of sale dates, sale amounts, discounts, and brand names. In addition the user activity data can contain one of merchant names and product names. Further, the user activity data is retrieved from a web scraping module.

In additional exemplary embodiments the AI engine can be configured to perform cluster analysis on the processed event data; and determine a confidence score indicative of a likelihood of an occurrence of the determined upcoming event predictions. Further, the predictive model can include at least one selected from the group of a hidden Markov model, a Gaussian mixture model, a pattern matching algorithm, a neural network, a matrix representation, (a vector quantization and decision tree, a supervised learning model, an unsupervised learning model, a semi-supervised learning model, a reinforcement learning model, a self-learning model, and a feature learning model.

In further additional exemplary embodiments, the AI engine is also configured to analyze event data associated with competing entities. The user profile can also be constructed with a recommendation engine implementing matrix factorization. The NLP module can implement text recognition, word segmentation, and semantic parsing. The AI engine can also be further configured to: provide a web scraping module configured to retrieve and store product and brand information from receipts contained in a user's email account, and to present the web scraping module to the user.

BRIEF DESCRIPTION OF THE DRAWINGS

Various embodiments of the present disclosure, together with further objects and advantages, can best be understood by reference to the following description taken in conjunction with the accompanying drawings.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The present disclosure provides an artificial intelligence (AI) system and methods for aggregating data, generating predictions of cyclical events, and selectively presenting generated event predictions based on user preferences.

Benefits of the systems and methods disclosed herein include efficiently and selectively presenting future event predictions to users to guide decision making and help users avoiding taking actions at suboptimal times. For example, systems and methods disclosed herein can assist users with purchasing decisions and assist users in avoiding extra expenses by making purchasing decisions at inopportune times, such as immediately before an upcoming sales event. Systems and methods disclosed herein can also remind users of preferred brands and products, and of brand-specific seasonal sales events before making purchasing decisions. Further benefits of the systems of methods disclosed herein to users include saving time and effort in tracking past and upcoming events, and reducing the need for users to, e.g., manually search their email account or the internet to discover what events are being offered now and in the future.

In addition to benefits to users, systems and methods disclosed herein can benefit merchants and brand manufacturers by reminding interested users of preferred brands and products and of upcoming sales events related thereto. By raising awareness of brands, products, and sales events to interested users, merchants and brand manufacturer can realize increased sales and improved relationships with users.

Figure 1A:
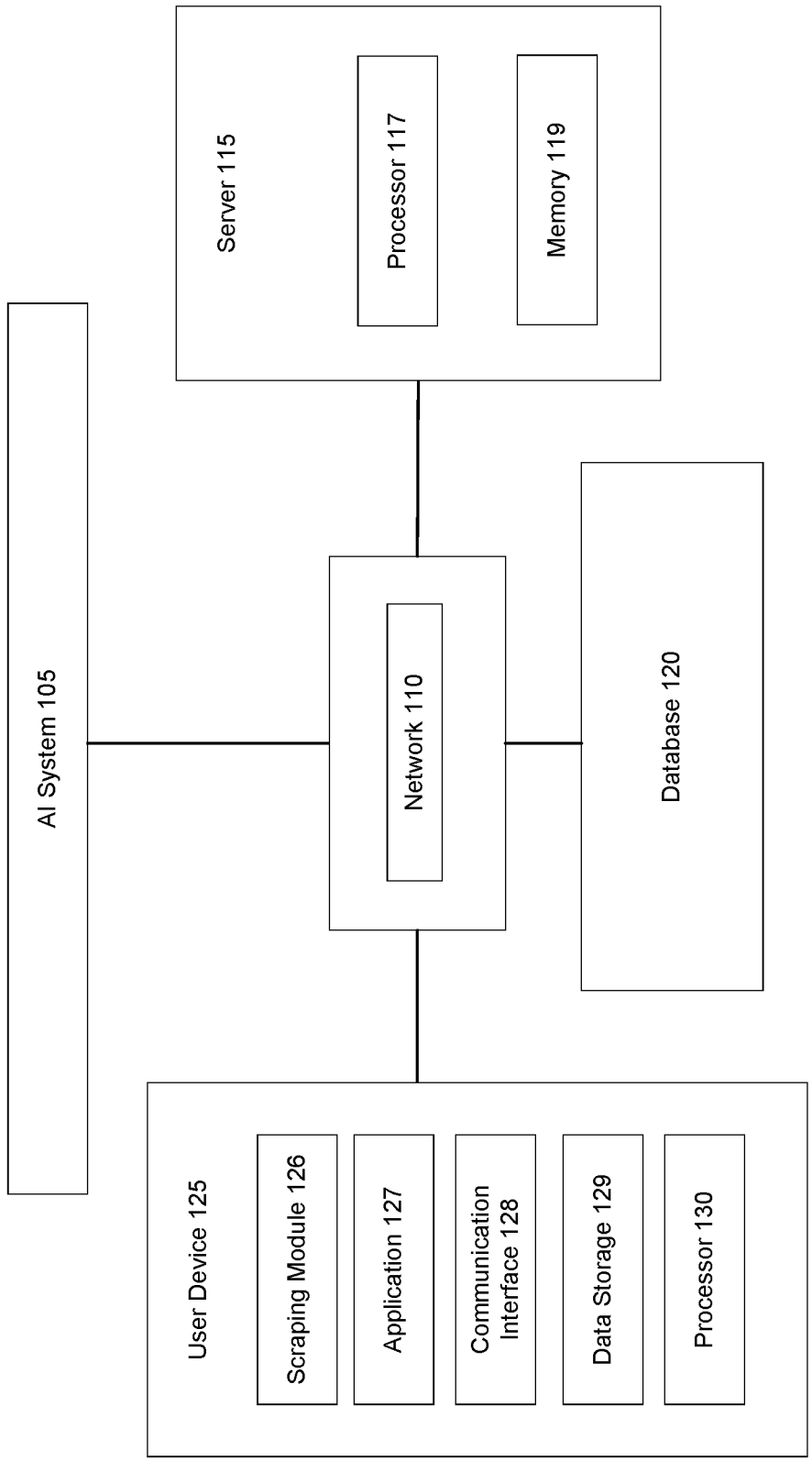
FIG. 1A depicts an artificial intelligence system according to an exemplary embodiment.

FIG. 1A illustrates an exemplary system 100 for predicting events and for selectively providing the predicted events to users. The system 100 can comprise an AI-based system 105, a network 110, a server 115, a database 120, and one or more user devices 125. FIG. 1A may reference the same or similar components, and data as the AI-based system in FIG. 1B, the processes illustrated in FIGS. 3A, 3B and 4, the sequence diagram in FIG. 5, and/or the data, data sources, and transformed data illustrated in FIG. 2.

The user device 125 can include a network-enabled computer system and/or device. As referred to herein, a network-enabled computer system and/or device can include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, a smart card, or other device. The network-enabled computer systems can execute one or more software applications to, for example, receive data as input from an entity accessing the network-enabled computer system, process received data, transmit data over a network, and receive data over a network.

The user device 125 can include at least one processor 130, which can be a central processing unit (CPU), which can be configured to execute computer program instructions to perform various processes and methods. The at least one CPU can comprise several processors, a single processor, or a single device having multiple processors.

The user device 125 can include a data storage 129, including for example, random access memory (RAM) and read only memory (ROM), which can be configured to access and store data and information and computer program instructions. The data storage can also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email account application and/or other applications, and data files can be stored. The data storage of the network-enabled computer systems can include electronic information, files, and documents stored in various ways, including, for example, a flat file, indexed file, hierarchical database, relational database, such as a database created and maintained with software from, for example, Oracle® Corporation, Microsoft® Excel® file, Microsoft® Access® file, a solid state storage device, which can include an all flash array, a hybrid array, or a server-side product, enterprise storage, which can include online or cloud storage, or any other storage mechanism.

The data storage 129 can be a read-only memory, write-once read-multiple memory or read/write memory, e.g., RAM, ROM, and EEPROM, and the User Device 125 can include one or more of these memories. A read-only memory can be factory programmable as read-only or one-time programmable. One-time programmability provides the opportunity to write once then read many times. A write once/read-multiple memory can be programmed at a point in time after the memory has left the factory. Once the memory is programmed, it can not be rewritten, but it can be read many times. A read/write memory can be programmed and re-programed many times after leaving the factory. It can also be read many times.

Although depicted as single elements, it should be appreciated that according to one or more embodiments, the user device 125 can comprise a plurality of user devices 125. As shown in FIG. 1A, the user device 125 can include various components. As used herein, the term "component" can be understood to refer to computer executable software, firmware, hardware, and/or various combinations thereof. It is noted there where a component is a software and/or firmware component, the component is configured to affect the hardware elements of an associated system. It is further noted that the components shown and described herein are intended as examples. The components can be combined, integrated, separated, or duplicated to support various applications. Also, a function described herein as being performed at a particular component can be performed at one or more other components and by one or more other devices instead of or in addition to the function performed at the particular component. Further, the components can be implemented across multiple devices or other components local or remote to one another. Additionally, the components can be moved from one device and added to another device, or can be included in both devices.

The user device 125 can be any device capable of communicating via, for example, Bluetooth technology, NFC technology, WiFi Direct technology, and/or the like. The user device 125 can be associated with a user and can be configured to execute various functions to transmit and receive user data (e.g., security questions, answers to security questions, card number, account type, account balance, account limits, budget data, recent transactions, and/or the like). For example, the user device 125 could be an iPhone, iPod, iPad, and/or Apple Watch from Apple® or other mobile device running Apple's iOS operating system, devices running Google's Android® operating system, including, for example, smartphones running the Android® operating system and other wearable mobile devices, such as Google Glass® or Samsung Galaxy® Gear Smartwatch, devices running Microsoft's Windows® Mobile operating system, and/or any other smartphone, smartwatch, tablet, or like device, which can include personal assistant devices incorporating systems, such as Alexa, Siri, Google Assistant, and Microsoft Cortana, including home assistant devices such as Amazon Echo, Google Home, and the like.

The user device 125 can include components to send and/or receive data for use in other components, such as a communication interface 128. The communication interface 128 can include various hardware and software components, such as, for example, a repeater, a microwave antenna, or another network access device capable of providing connectivity between network mediums. The communication interface 128 can also contain various software and/or hardware components to enable communication over the network 110. For example, the communication interface 128 can be capable of sending or receiving signals via the network 110. Moreover, the communication interface 128 can provide connectivity to one or more wired networks and can be capable of receiving signals on a first medium (such as a wired network) and transmitting the received signals on a second medium (such as a wireless network). One or more users can access the network 110 through one or more user devices 125 that can be communicatively coupled to the network 110.

A current location of the user device 125 can be determined using many different technologies such as Global Positioning System (GPS) technology, Internet-based technology, etc., which can utilize location data. By way of example, location data can include, but is not limited to GPS data, assisted GPS data, IP address data, cell identification data, received signal strength indication (RSSI) data, wireless fingerprinting data, inertial sensor data (e.g., compass or magnetometer data, accelerometer data, and/or gyroscope data), barometer data, ultrasonic data (e.g., radio-frequency identification (RFID) data, near-field communication (NFC) data), Bluetooth data, and/or terrestrial transmitter data.

The user device 125 can also include various software components to facilitate the functionalities described herein, including an application processor (not shown in FIG. 1A). For example, the user device 125 can include an operating system such as, for example, the iOS® operating system from Apple®, the Google® Android® operating system, and the Windows Mobile® operating system from Microsoft®. The user device 125 can also include, without limitation, software applications 127 such as web browsing applications, email account applications, and mobile banking applications, an NFC application programming interface, and software to enable touch sensitive displays. User device manufacturers can provide software stacks or APIs which allow software applications to be written on top of the software stacks. For example, user device manufacturers can provide, without limitation, a card emulation API to enable NFC card emulation mode, a logic link control protocol (LLCP) API for peer-to-peer communication between user devices, a Bluetooth® API supporting Bluetooth Low Energy (BLE), and a real-time data (RTD) API and a NFC Data Exchange Format (NDEF) API for reading/writing. User device 125 can also include a scraping module 126 as described herein to monitor and collect user activity of software applications 127 (such as browsing and email account applications) on the user device 125. The scraping module 126 can then transmit, or cause to transmit, such monitored activity over the network 110 to AI-based system 105.

An application processor (not shown) can enable execution of software applications on the user device 125, which can include application 127 or scraping module 126. The application 127 and scraping module 126 can comprise instructions for execution on the user device 125. The application 127 and scraping module 126 can include various user interfaces, which can leverage account data, user device data, transaction data, wireless data connection, over-the-air data connection, or other means of data transmission.

The data used in the application 127 can be transmitted, for example, from external data sources. The application 127 can leverage information from public data sources, which can include traffic, weather, financial, legal data information and the like, as well information about an account or account holder, information about a merchant and/or other parties involved in a transaction, rewards information, promotional information, advertising information, and other useful information. The application 127 can be integrated with or separate from a wallet application, which can be utilized to seamlessly facilitate transactions.

The system 100 can include a network 110. In some examples, network 110 can be one or more of a wireless network, a wired network or any combination of wireless network and wired network, and can be configured to connect to any one of components of system 100. In some examples, network 110 can include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 110 can include, without limitation, telephone lines, fiber optics, IEEE Ethernet 902.3, a wide area network, a wireless personal area network, a LAN, or a global network such as the Internet. In addition, network 110 can support an Internet network, a wireless communication network, a cellular network, or the like, or any combination thereof. Network 110 can further include one network, or any number of the exemplary types of networks mentioned above, operating as a stand-alone network or in cooperation with each other. Network 110 can utilize one or more protocols of one or more network elements to which they are communicatively coupled. Network 110 can translate to or from other protocols to one or more protocols of network devices. Although network 110 is depicted as a single network, it should be appreciated that according to one or more examples, network 110 can comprise a plurality of interconnected networks, such as, for example, the Internet, a service provider's network, a cable television network, corporate networks, such as credit card association networks, and home networks.

System 100 can further comprise one or more servers 115. In some examples, the server 115 can include one or more processors 117 coupled to memory 119. The server 115 can be configured as a central system, server or platform to control and call various data at different times to execute a plurality of workflow actions. The server 115 can be configured to connect to any component of system 100 via network 110. The server 115 can be a dedicated server computer, such as bladed servers, or can be personal computers, laptop computers, notebook computers, palm top computers, network computers, mobile devices, wearable devices, or any processor-controlled device capable of supporting the system 100. While FIG. 1A illustrates a single server 115, it is understood that other embodiments can use multiple servers or multiple computer systems as necessary or desired to support the users and can also use back-up or redundant servers to prevent network downtime in the event of a failure of a particular server.

The server 115 can be in data communication with the processor 102. For example, a server 115 can be in data communication with AI-based system 105 via one or more networks 110. The AI-based system 105 can transmit one or more requests to the server 115. The one or more requests can be associated with retrieving data from the server 115. The server 115 can receive the one or more requests from any component of AI-based system 105. Based on the one or more requests from, for example the processor 102, the server 115 can be configured to retrieve the requested data. The server 115 can be configured to transmit the received data to the processor 102, the received data being responsive to one or more requests.

In some examples, the server 115 can be a dedicated server computer, such as bladed servers, or can be personal computers, laptop computers, notebook computers, palm top computers, network computers, mobile devices, wearable devices, or any processor-controlled device capable of supporting the system 100. While FIG. 1A illustrates a server 115, it is understood that other embodiments can use multiple servers or multiple computer systems as necessary or desired to support the users and can also use back-up or redundant servers to prevent network downtime in the event of a failure of a particular server.

The server 115 can include a processor 117. The processor 117 can be, for example, one or more microprocessors. The processor 102 can include processing circuitry, which can contain additional components, including additional processors, memories, error and parity/CRC checkers, data encoders, anti-collision algorithms, controllers, command decoders, security primitives and tamper-proofing hardware, as necessary to perform the functions described herein.

The server 115 can include an application comprising instructions for execution thereon (not shown). For example, the application can reside in memory 119 of server 115 and can comprise instructions for execution on the server 115. The application of the server 115 can be in communication with any components of system 100. For example, server 115 can execute one or more applications that enable, for example, network and/or data communications with one or more components of system 100 and transmit and/or receive data. Without limitation, the server 115 can be a network-enabled computer. As referred to herein, a network-enabled computer can include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. The server 115 also can be a mobile device; for example, a mobile device can include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 115 can include processing circuitry and can contain additional components, including processors, memories, error and parity/CRC checkers, data encoders, anticollision algorithms, controllers, command decoders, security primitives and tamperproofing hardware, as necessary to perform the functions described herein. The server 115 can further include a display and input devices. The display can be any type of device for presenting visual information such as a computer monitor, a flat panel display, and a mobile device screen, including liquid crystal displays, light-emitting diode displays, plasma panels, and cathode ray tube displays. The input devices can include any device for entering information into the user's user device that is available and supported by the user's user device, such as a touch-screen, keyboard, mouse, cursor-control device, touch-screen, microphone, digital camera, video recorder or camcorder. These devices can be used to enter information and interact with the software and other devices described herein.

System 100 can include one or more databases 120. The database 120 can comprise a relational database, a non-relational database, or other database implementations, and any combination thereof, including a plurality of relational databases and non-relational databases. In some examples, the database 120 can comprise a desktop database, a mobile database, or an in-memory database. Further, the database 120 can be hosted internally by any component of system 100, such as the AI-based system 105, or server 115, or the database 120 can be hosted externally to any component of the system 100, such as the AI-based system 105, or server 115, by a cloud-based platform, or in any storage device that is in data communication with the AI-based system 105 and server 115. In some examples, the database 120 can be in data communication with any number of components of system 100. For example, the server 115 can be configured to retrieve the requested data from the database 120 that is transmitted by the processor 102. Server 115 can be configured to transmit the received data from database 120 to the processor 102 via network 110, the received data being responsive to the transmitted one or more requests. In other examples, the processor 102 can be configured to transmit one or more requests for the requested data from database 120 via network 110.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the AI-based system 105, server 115, and/or database 120, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein.

Figure 1B:
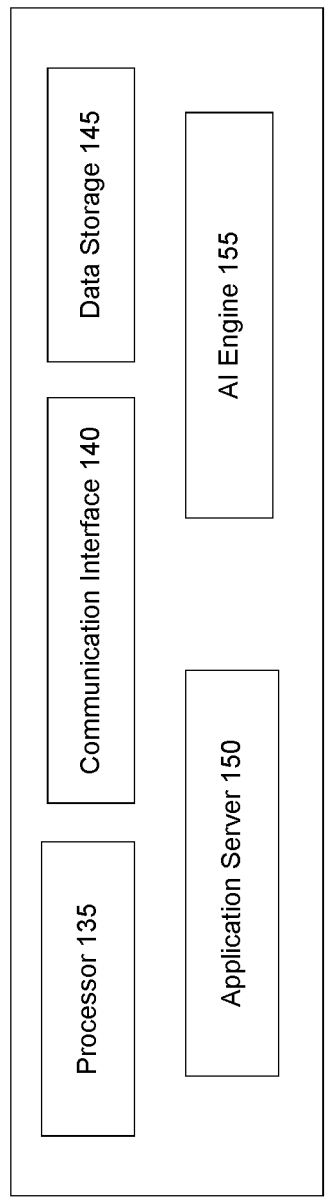
FIG. 1B depicts an artificial intelligence system according to an exemplary embodiment.

As depicted in FIG. 1B, the AI-based system 105 (which also may be referred to as an artificial intelligence (AI)

system) can include an AI engine 155, Processor 135, an application server 150, a data storage 145, and a communication interface 140. The AI-based system 105 can include data and/or components, systems, and interfaces, including application programming interfaces (APIs) to enable the generation, transmission, and processing of data. FIG. 1B may reference the same or similar components, and data as the system 100 in FIG. 1A, the processes illustrated in FIGS. 3A, 3B and 4, the sequence diagram in FIG. 5, and/or the data, data sources, and transformed data illustrated in FIG. 2. For example, AI engine may include a natural language processing (NLP) module (not shown in FIG. 1B).

The AI-based system 105 can include a network-enabled computer system and/or device. The network-enabled computer systems can execute one or more software applications to, for example, receive data as input from an entity accessing the network-enabled computer system, process received data, transmit data over a network, and receive data over a network.

The AI-based system 105 can include at least one processor 135, which can be a central processing unit (CPU), which can be configured to execute computer program instructions to perform various processes and methods. The at least one CPU can comprise several processors, a single processor, or a single device having multiple processors.

The AI-based system 105 can include a data storage 145, including for example, random access memory (RAM) and read only memory (ROM), which can be configured to access and store data and information and computer program instructions. The data storage can also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser applications, email account applications and/or other applications, and data files can be stored. The data storage of the network-enabled computer systems can include electronic information, files, and documents stored in various ways, including, for example, a flat file, indexed file, hierarchical database, relational database, such as a database created and maintained with software from, for example, Oracle® Corporation, Microsoft® Excel® file, Microsoft® Access® file, a solid state storage device, which can include an all flash array, a hybrid array, or a server-side product, enterprise storage, which can include online or cloud storage, or any other storage mechanism.

The data storage 145 can be a read-only memory, write-once read-multiple memory or read/write memory, e.g., RAM, ROM, and EEPROM, and the AI-based system 105 can include one or more of these memories. A read-only memory can be factory programmable as read-only or one-time programmable. One-time programmability provides the opportunity to write once then read many times. A write once/read-multiple memory can be programmed at a point in time after the memory has left the factory. Once the memory is programmed, it can not be rewritten, but it can be read many times. A read/write memory can be programmed and re-programed many times after leaving the factory. It can also be read many times.

Although depicted as single elements, it should be appreciated that according to one or more embodiments, the AI-based system 105 can comprise a plurality of AI-based systems 105. As shown in FIG. 1B, the AI-based system 105 can include various components. The components can be combined, integrated, separated, or duplicated to support various applications. Also, a function described herein as being performed at a particular component can be performed at one or more other components and by one or more other devices instead of or in addition to the function performed at the particular component. Further, the components can be implemented across multiple devices or other components local or remote to one another. Additionally, the components can be moved from one device and added to another device, or can be included in both devices.

The AI-based system 105 can include components to send and/or receive data for use in other components, such as a communication interface 140. The communication interface 140 can include various hardware and software components, such as, for example, a repeater, a microwave antenna, or another network access device capable of providing connectivity between network mediums. The communication interface 140 can also contain various software and/or hardware components to enable communication over the network 110. For example, the communication interface 140 can be capable of sending or receiving signals via the network 110. Moreover, the communication interface 140 can provide connectivity to one or more wired networks and can be capable of receiving signals on a first medium (such as a wired network) and transmitting the received signals on a second medium (such as a wireless network).

The application server 150 may include hardware and/or software that is dedicated to the efficient execution of procedures (e.g., programs, routines, scripts) for supporting its applied applications. The application server 150 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. The application server 150 may support the construction of dynamic pages. The application server 150 also may implement services, such as, for example, clustering, failover, and load balancing. In various embodiments, where the application server 150 are Java application servers, the application server 150 may behave like an extended virtual machine for running applications, transparently handling connections to databases on one side, and connections to the web client (e.g., user device 125) on the other side.

The AI-based system 105 can access user data scraped from scraping module 126 from the one or more user devices 125 depicted in FIG. 1A, and or data from external websites and servers, as is described more fully herein. The AI-based system 105 can make API calls to the scraping module 126 or the like to obtain user data.

The AI-based system 105 can have differentiated access to other third party systems (such as systems of banking and other financial entities), including public data source systems via private APIs. The AI-based system 105 can also have differentiated access to user devices (e.g., the user devices 125) via private device APIs. The AI-based system 105 can make calls to the private APIs utilizing a token to provide a secure communication channel between the AI-based system 105 and other third party systems. The device APIs can also provide a secure communication between the user device 125 and the AI-based system 105.

The AI engine 155 can receive real time input data from the user device 125 via API calls to the scraping module 126, and can utilize AI technologies to parse and process the input data to extract conditionally relevant meaning from the input data. In this example, the AI engine 155 can receive user activity from the user of the user device 125 via the scraping module 126, and can utilize natural language processing technologies to process the input user activity data to extract conditionally relevant meaning from the data.

Accordingly, the AI engine 155 can determine the relevancy of user activity data with respect to indicating a user preference in a brand or product and a confidence in such a determination.

The AI engine 155 can identify and scrape event data from third party websites and other sources. The AI engine 155 can utilize AI technologies to parse and process such data to extract conditionally relevant meaning from the input data. The AI engine 155 can receive the input data that can be collected as a subscription to a stream of data or as a periodic polling of data. The AI engine 122 engine can iteratively collect the most recent data and compare it to the next most recent to determine if any data is new and accordingly need to be parsed and processed to extract conditionally relevant meaning. For example, the application server 124 coupled to the AI engine 155 can receive scraped website data from a brand's social media page. The application server 150 can also periodically check and request data from an external data source.

The processed data can be aggregated across the one or more data sources. The AI engine 155 can continuously evaluate the aggregated data to determine whether the one or more conditions is met. To minimize system resources, the AI-based system 105 can store the compressed aggregated data in the data storage 145. The compressed aggregated data can include the associated conditionally relevant meaning verification and associated metadata necessary to establish proof of occurrence of the condition, rather than the raw received input data. Specifically, the AI-based system 105 can automatically determine whether data is consequential by evaluating whether the data is pertinent to determining whether a condition has been met and/or is associated with data that does not satisfy a condition. Inconsequential data can be purged by the AI-based system 105 to save storage space. For example, data which is not relevant to a particular user's preferences or relevant for a past event, or which is redundant of information already stored in data storage 145. Consequential data can include data of previously processed transactions, previous user activity data, and previous events for brands and/or certain products that can be utilized to predict a likelihood of future events. As such, this data that surrounds transactions (in time), which can be inferred to be consequential based on patterns, can also be stored in the data storage.

The AI engine 122 can transmit via the communication interface 128 a push notification to the user device 125 via the user application 114. The push notification can include data indicative of one or more event prediction. The AI engine 122 can also transmit, or cause transmit text messages, emails, or other forms of communication to the user device 125.

One or more predictions by the AI engine 155 can be developed by one or more machine learning algorithms and generated by the application of by one or more predictive models. In an embodiment, the machine learning algorithms employed can include at least one selected from the group of gradient boosting machine, logistic regression, neural networks, and a combination thereof, however, it is understood that other machine learning algorithms can be utilized.

For example, to generate predictions, one or more predictive models can utilize event information relating to the variables described herein, including without limitation, the frequency, duration, and characteristics of previous events for sales of the same, similar, and competing products and brands, and user preferences of a variety of different users to generate a user profile indicating a user's preferences for receiving certain event predictions, and transaction histories from a variety of different users who have purchased, viewed, or considered the same, similar, or competing products and brands.

The predictive models described herein can utilize a Bidirectional Encoder Representations from Transformers (BERT) models. BERT models utilize use multiple layers of so called "attention mechanisms" to process textual data and make predictions. These attention mechanisms effectively allow the BERT model to learn and assign more importance to words from the text input that are more important in making whatever inference is trying to be made.

Alternatively, the predictive models described herein can utilize various neural networks, such as convolutional neural networks (CNNs) or recurrent neural networks (RNNs), to generate the exemplary models. A CNN can include one or more convolutional layers (e.g., often with a subsampling step) and then followed by one or more fully connected layers as in a standard multilayer neural network. CNNs can utilize local connections, and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that can not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

The predictive models described herein can be trained on one or more training datasets, each of which can comprise one or more types of data. In some examples, the training datasets can comprise previously-collected data, such as data collected from previous uses of the same type of systems described herein and data collected from different types of systems. In other examples, the training datasets can comprise continuously-collected data based on the current operation of the instant system and continuously-collected data from the operation of other systems. In some examples, the training dataset can include anticipated data, such as the anticipated future events, currently scheduled events, and planned future events, for the instant system and/or other systems. In other examples, the training datasets can include previous predictions for the instant system and other types of system, and can further include results data indicative of the accuracy of the previous predictions. In accordance with these examples, the predictive models described herein can be training prior to use and the training can continue with updated data sets that reflect additional information.

Examples of predictive models that may be implemented include a hidden Markov model, a Gaussian mixture model, a pattern matching algorithm, a neural network, a matrix representation, (a vector quantization and decision tree, a supervised learning model, an unsupervised learning model, a semi-supervised learning model, a reinforcement learning model, a self-learning model, and a feature learning model.

Figure 2:
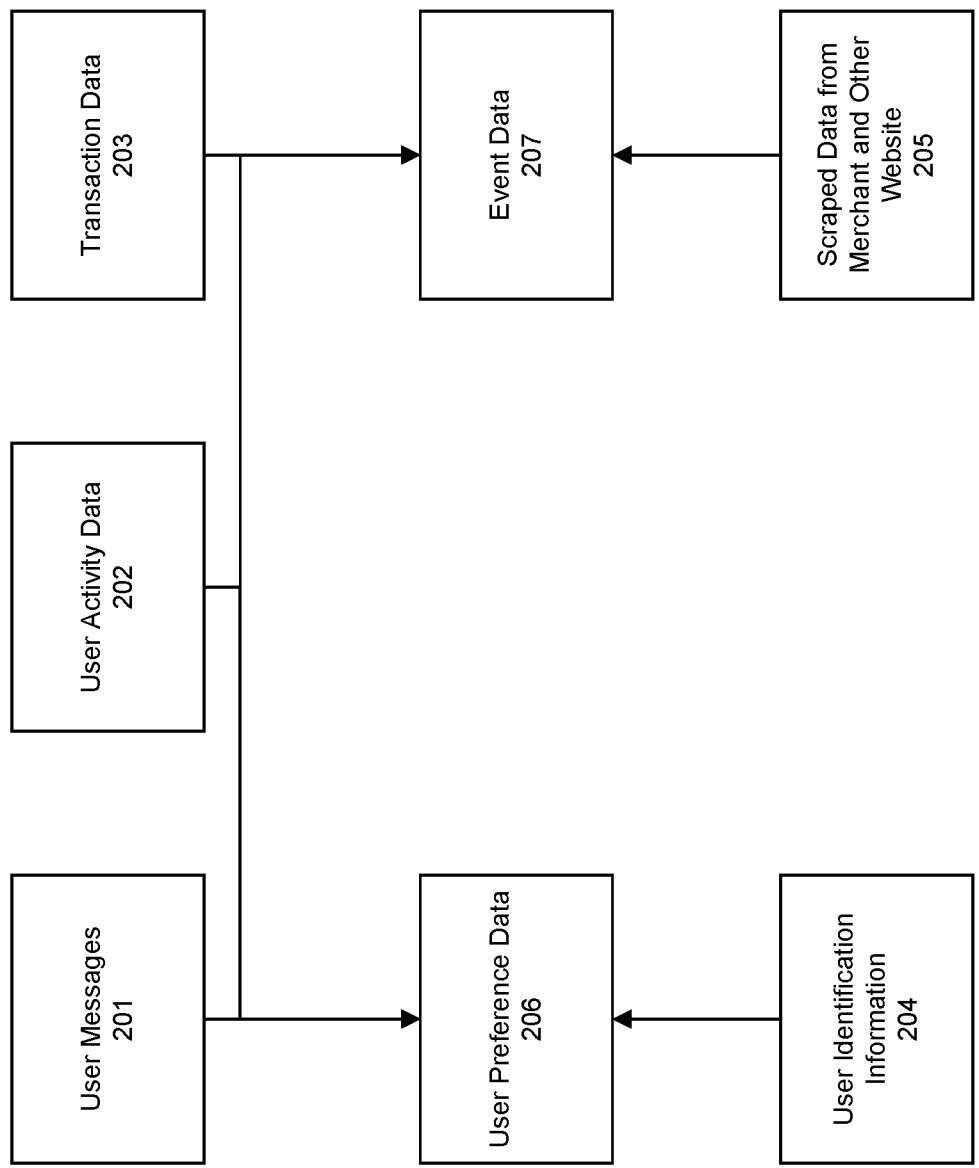
FIG. 2 is a block diagram illustrating various data, data sources, and transformed data 200 that are used by the artificial intelligence system according to an exemplary embodiment.

FIG. 2 is a block diagram illustrating various data, data sources, and transformed data 200 that are used by the AI system described herein. FIG. 2 may reference the same or similar components, and data as the system 100 in FIG. 1A, the AI-based system in FIG. 1B, and the processes illustrated in FIGS. 3A, 3B and 4, the sequence diagram in FIG. 5.

The AI engine can retrieve specific types of data, including user messages 201, user activity data 202, and transaction data 203 collected from a scraping module, event data 207 scraped from a merchant website or other website from a scraper module; transaction data 203 from an entity providing financial services to a user. The AI engine can also perform various operations on the data, including, formatting and transforming the user messages 201, user activity data 202, transaction data 203, and user identification information 204 into user preference data 206, applying natural language processing to event data 207, applying machine learning algorithms to processed event data to generate predicted events, applying matrix factorization to user preference data 206 to generate user profiles, and determining particular predicted events to provide to users based on their generated user profile.

Exemplary embodiments describe a system and method for determining user preference data 206. User preference data 206 are sets of data that represent the preferences that a particular user has for certain types of products and brands. User preference data 206 can be stored and retrieved by the AI engine, or the AI engine can derive user preference data 206 from other data sources, such as user messages 201, user activity data 202, transaction data 203, and user identification information 204.

The AI engine also can retrieve and store user identification information 204, which can include information identifying a particular user, such as the user's name, current location, home address, gender, age, income, credit score, and other personal characteristics of the user. This information may be provided by the user to the AI engine (for example, when the user signs up for an event prediction service), or this information may be derived from information scraped by the scraping module, or provided by other sources (such as credit card, or financial institutions).

Transaction data 203 can include details about credit card or other financial transactions of the user. User messages 201 can include email messages, text messages, instant messages, and any other recorded messages stored on a user's user device. User messages 201 can be recorded or scraped using a scraping module on the client's device which is further described herein. User messages may be scraped for, for example, sale dates, sale amounts, discounts, and brand names, by the scraping module to be used by the AI engine in exemplary embodiments. User activity data 202 refers to data that is recorded or scraped relating to the user's use of their user device, such as the user browsing the internet, or using third party applications. User activity data may be scraped by the scraping module based on merchant names and product names derived from user activity data.

Exemplary embodiments can utilize the scraping module which can monitor and record a user's activity on their device, in order to record relevant user messages 201 and user activity data 202 on the user's user device. The scraping module can for example, monitor a user's activity on their user device, including monitoring the transactions conducted by a user on third party websites or applications, scraping communications (including email account applications), and monitoring and recording the user's browser or third party application usage. A third party application can be, for example, a social media application, a shopping application, a mobile game that includes advertisements for certain products and brands, or any other third party application where a user can express or otherwise indicate his or her preference for a particular brand or product. The scraping module can, for example, be an extension of the user's browser, email account application, or third party application, can be a standalone application or API on the user's user device, or can otherwise be provided in another manner to provide the functionality described herein. The scraping module can be implemented as a single application, or as multiple applications (e.g. a separate applications for scraping user activity for each application a user uses).

The scraping module can, for example, scrape a user's email account application's inbox for email messages containing communications from brands including electronic receipts. Electronic receipts can be generated upon the completion of a transaction of a particular product by the user, and contain details about product and brand information for a particular transaction, including the price and nature of the product purchased. The scraping module can advantageously capture granular details of a particular transaction contained in an electronic receipt in the user's email, including the date of the transaction, the price of product or products included in the transaction, a unique identifier of the product(s) (such as stock keeping-unit (SKU) number), and the brand of the product(s).

The scraping module can advantageously capture granular details about purchases a user contemplated but did not actually execute. For example, whenever a user places an item into a checkout bag on a vendor's website or on a third-party application, the scraping module can record the details about such an item. The scraping module can also capture information regarding products that a user places on his or her wish list, or products that the user otherwise spends a substantial amount of time reading about or researching, but never purchases. The browser extension can also capture emails or other communications from third party vendors advertising the sale of particular products.

The scraping module can be configured to operate in the background while the user uses an internet browser, email application, or a third party application, for example. The scraping module can be downloaded and installed on a user's user device or can be run remotely from a server as an API.

The user can opt in or out of using the scraping module monitoring the user's activity. When the user logs into their email service the user can be prompted with a message which asks whether the user agrees for the extension or scraping module to access the user's emails and/or internet usage for the purpose of recommending personalized event predictions for particular products to the user. As another example, when the user uses a search engine the user can be prompted with an inquiry about whether the scraping module has permission to monitor the user's activity on the search engine. Likewise, in the case where the scraping module monitors the user's third party application usage, the user can be provided with an option to opt in to or out of the scraping module monitoring its activity when the user opens the third party browser or extension. Permission can, for example, be given only once, when the user first downloads the scraping module. The scraping module can thereafter record the user's activities without interrupting the user. Alternatively, the scraping module can request for permission to monitor the user whenever the user opens an instance of a particular application or browser which the scraping module seeks to monitor.

A banking or other financial institution which issues the user a credit, debit or other payment card can provide information relating to the user transaction data 203 and user identification information 204. In some embodiments the banking or other financial institution with issues a payment card to the user can be the same entity that collects user messages 201, user activity data 202, transaction data 203, and user identification information 204 used to generate predictions for future events as described herein. In other embodiments these entities can be independent of one another. The user can also opt into or opt out of the service which monitors and records the user's transaction data 203 for the purposes of collecting information relevant to the preferences a user has for brands, and products. Alternatively the scraping module may request permission to collect user transaction data 203 whenever the user accesses their bank, credit card, or other financial accounts online, and may thereafter collect such information from a webpage or application containing such transaction data 203. The user can also opt into or opt out of providing user identification information 204 for user profile generation as described herein.

The AI engine in the exemplary systems and methods described herein may utilize the user messages 201, user activity data 202, transaction data 203, and user identification information 204 to construct user preference data 206, and may aggregate user messages 201, user activity data 202, transaction data 203, and/or user identification information 204 from a multitude of users for event data 207.

Event data 207 can be used by the AI engine to generate predictions for future events by brands for the sale or discounts for specific products using machine learning models. Event data 207 refers to the entire data set that the machine learning models described herein will use to making such predictions about future events. Event data 207 include data pertaining to a multitude of items offered for sale from a plurality of brands.

In addition, event data 207 can be provided directly from third party merchants to the entity collecting event data 207 for the purpose of providing predictions of future events to users. Such third parties can have a contractual arrangement with the entity providing the event prediction service. Event data 207 includes information which the AI engine can use to determine event dates (when particular events took place and for how long) and event details (the nature of the sales, discounts, and/or other benefits offered at the event).

Event data 207 can include user messages 201, user activity data 202, and transaction data 203 from a variety of users who have opted into allowing their personal data to be used. Event data 207 can be stored on a remote, secure, and centralized server for use in the machine learning models described herein. A user can be able to opt in and opt out of any of its user messages 201, user activity data 202, and transaction data 203 from being used as event data 207 before any such data is used in this manner. The user can however, provide permission for any of their user messages 201, user activity data 202, and transaction data 203 to be used by the service provider to determine their user profile (which is described in further detail below) and to provide personalized event predictions to the user, even if such data is not aggregated in event data 207.

Event data 207 can also include data scraped from merchant and other websites that are publically available. The provider of the event predictions service can utilize a scraper software module that scrapes information from merchant's websites, archived versions of merchant websites, and other websites, such as social media sites and the like, which contain information relating to past, current, and future prices, upcoming events, and/or previous events.

User messages 201, user activity data 202, transaction data 203, and/or user identification information 204 can also be used to construct a user preference data 206 by the AI engine. The user preference data 206 can be stored as a list of products and brands a particular customer is interested in, and a score indicating the user's preference for each listed product and brand. The score assigned to each product or brand can be altered based on the frequency in which a user has purchased each listed product, or products from each listed brand. Further, the preference score can be altered by how recently the user has purchased particular products or products from a particular brand, and how much time a user spends browsing or otherwise interacting with particular products or brands on his or her user device (as indicated by the user activity data 202 obtained from the scraping module). For example, a user purchasing a specific product, or product from a specific brand several times over the past month can be given a relatively high preference score indicating a stronger preference for that particular brand or product compared to products or brands that the user has not purchased in over a year. As another example, a relativity lower preference score would be applied to particular products or brands when the user merely placed such products or products of such brands in his or her checkout bag without actually completing a transaction than products or brands that the user has actually purchased.

The conversion of user messages 201, user activity data 202, and transaction data 203, into user preference data 206 can involve constructing a matrix or table indicating the preference score assigned to each of a variety of products and brand by the AI engine. User preference data 206 may even include products or brands of which the user has never purchased.

As described in exemplary embodiments herein, the AI engine can advantageously consider user preference data 206 of other users in order to predict preferences for a particular user. For example, the AI engine may determine that the first user is interested in baseball jerseys, even if the user preference data 206 of the first user contains no record of the first user ever purchasing a baseball jersey. As described further herein, the AI engine can advantageously utilize machine learning models to construct user profiles in order to make such a determination.

User messages 201, and user activity data 202 can be processed using a Natural Language Processing (NLP) module by the AI engine, which is described further detail herein, by the AI engine for the purpose of constructing user preference data 206 by the AI engine. For example, NLP processing may enable the AI engine to associate the context around certain user activity data 202 (such as webpages visited, or emails from certain brands) to determine the associated user preference level with such user activity data 202.

Figure 3A:
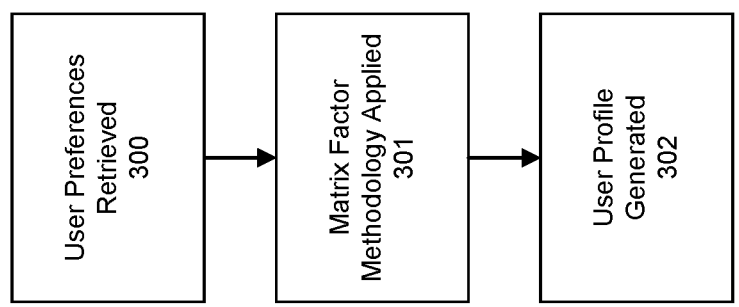
FIG. 3A is a block diagram illustrating an exemplary process for generating upcoming event predictions and generating user profiles by the artificial intelligence system.

FIG. 3A is a block diagram illustrating an exemplary process for generating upcoming event predictions and generating user profiles for use in selectively providing notice of predicted events to users. FIG. 3A may reference the same or similar components, and data as the system 100 in FIG. 1A, the AI-based system in FIG. 1B, the processes illustrated in FIGS. 3B and 4, the sequence diagram in FIG. 5, and/or the data, data sources, and transformed data illustrated in FIG. 2.

At step 300 user preference data 206 can be retrieved from the storage or memory of a server or any other storage component. User preference data 206 can be derived from user messages 201, user activity data 202, transaction data 203, and/or user identification information 204 as described in connection with FIG. 2.

At step 301 a matrix factorization methodology can be applied by the AI engine to the user preference data 206 to generate a user profile for a specific user. This matrix factorization methodology accomplishes this by comparing user preference data 206 between different users. The AI engine at step 302 generates a user profile pertaining to a specific user that indicates the preferences a user has for particular brands and products as indicated by the user's user messages 201, user activity data 202, transaction data 203, and/or user identification information 204 as well as any predicted user preferences for products and brands which the user has not purchased, but would likely desire purchasing as determined by the AI engine.

To accomplish this, the AI engine can utilize a machine learning model implementing matrix factorization methodologies. User preference data 206 from a variety of users as a training set may be implemented for this purpose. In exemplary embodiments, the AI engine can construct a matrix which represents different users in each row of the matrix and different brands in each column of the matrix. The preference a user has for a particular brand can be indicated in the specific column and row representing the specified user and brand. The preference level can be associated with numerical preference scores contained in user preference data 206 for particular products and brands. Alternatively, the preference level in the matrix can be given a binary 1 or 0 score, depending on whether the particular user specified in the row of the matrix has purchased an item from the brand represented in the column of the matrix. Using a binary system can lead to less accurate results in generating a user profile, but such results would be quicker to process a matrix utilizing the numeric preference score contained in user preference data 206.

The AI engine can perform matrix factorization methodologies using machine learning using the matrix as described above to determine the overlap between similar users. If a first user has a preference for a particular brand the via a machine learning model the AI engine can determine that other users who share that preference also have a preference for other brands selling the same or similar products. Thus, the machine learning model can use user preference data 206 of other users to predict what the preferences a specific user may have by implementing, for example, probabilistic matrix factorization. The AI engine will thus generate a user profile that includes the preferences a user has for particular brands and products, and predicted user preferences for particular products and brands. The matrix factorization methodology described herein is merely exemplary, and the invention contemplates predicting preferences levels for particular products and brands using other types of models, including other types of recommendation engine or any other computer functionality capable of comparing user preference data 206 from a plurality of users in the manner described herein.

The user identification information 204 associated with the user preference data 206 for each user the AI engine considers when constructing user profiles may also be considered. For example, the AI engine may only utilize user preference data 206 for users having a home address in a particular country, or state, or may only compare user preference data 206 for users within a range of income, or within a certain age range. The AI engine may also otherwise assign more weight to user preference data 206 of similar users as indicated by user identification information 204 when applying matrix factorization.

Figure 3B:
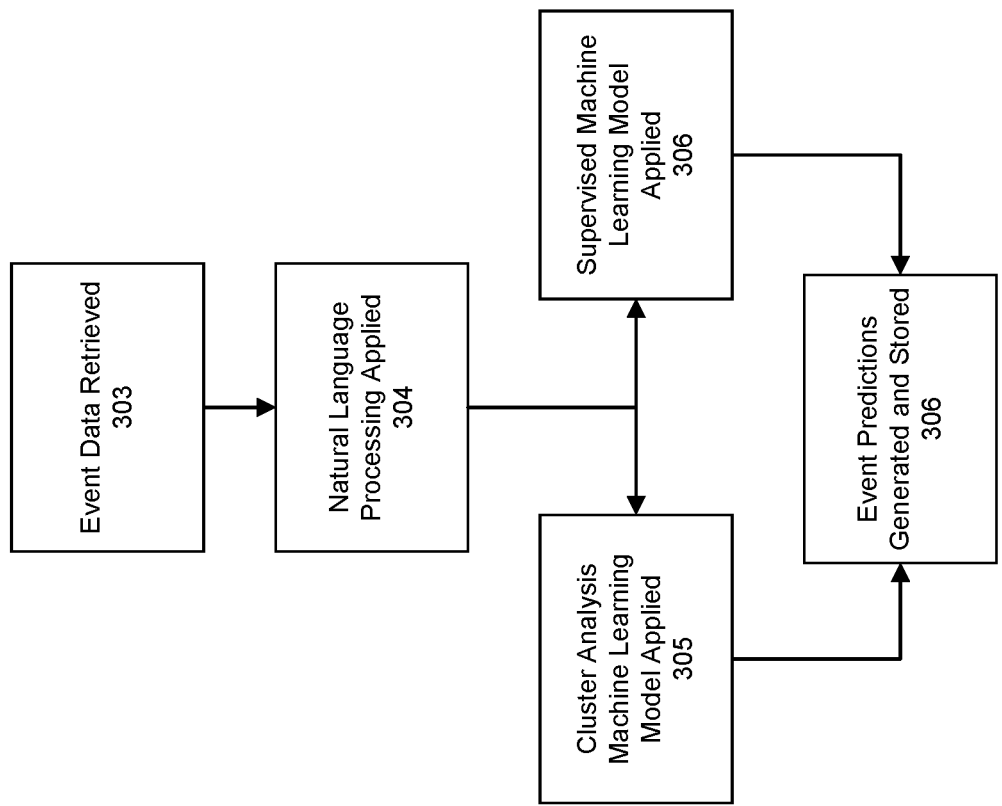
FIG. 3B is a block diagram illustrating an exemplary process for generating predictions of upcoming events

At step 302 of FIG. 3B, based on the matrix factorization of the user preference data 206, the AI engine can generate a user profile, which can be used by the AI engine to determine which event predictions to transmit to which users. For example, if the generated user profile specifies that a first user can has a preference for a particular brand of sneaker (which was generated using the matrix factor methodology as described herein), the AI engine can transmit the first user predictions on events offered for by sneaker brands, including, but not limited, to the particular brand the consumer has a preference for and additional sneaker brands that other similar users have a preference. The AI engine can make such a transmission when it determines that it is an appropriate time based on the current user activity data of the user. The AI engine can store user profiles for predicted event for the sale of certain products or brands in memory or storage of the system. The user profile can advantageously be generated and stored before the AI engine determines to provide a specific event prediction in accordance of their user profile, so that when the AI engine determines it is an appropriate moment to provide an event prediction to a user, it can do so without having to run the relatively computational heavy user profile generation.

The AI engine can advantageously regenerate user profiles as additional user messages 201, user activity data 202, transaction data 203, and/or user identification information 204 from existing and new users. As more data is collected, the AI engine can regenerate more robust existing user profiles using larger set of testing data.

FIG. 3B is a block diagram illustrating an exemplary process for generating predictions of upcoming events. FIG. 3B may reference the same or similar components, and data as the system 100 in FIG. 1A, the AI-based system in FIG. 1B, the processes illustrated in FIGS. 3A and 4, the sequence diagram in FIG. 5, and/or the data, data sources, and transformed data illustrated in FIG. 2.

At step 303 event data 207 can be retrieved from the storage or memory of a server or any other storage component. Event data 207 can be obtained from user messages 201, user activity data 202, and transaction data 203 of various users or from scraping merchant, and scraped webpages 205 as described in connection with FIG. 2.

The AI engine can utilize machine learning models to determine event prediction by using processed event data such as training data. At step 304 a NLP module can preprocess the event data 207 so that the machine learning model used by the AI engine can more readily determine whether a particular piece of data contained in user messages 201, user activity data 202, and transaction data 203, or from scraped webpages 205 (all of which are included in event data 207) refers to a particular sales event. NLP preprocessing can advantageously be used by the AI engine to refine the event data 207 so that the context surrounding points of the data can be taken into consideration. The NLP module can utilize word segmentation, and semantic parsing. For example, the surrounding words and sentences that a particular scraped website included in the event data 207 can be taken into consideration during NLP preprocessing. The words "event," "sale," "discount," "deal," and "bargain," for example, can be flagged, and the NLP preprocessing can indicate that a particular website, application, or other piece of data in the event data 207 contains a certain number of flagged words, and thus is associated with an event associated with a particular product or brand.

The AI engine can also preprocess the event data 207 by considering the listed sale prices of a product of a particular brand contained in the event data 207 over periods of time. Based on the listed sales prices, the AI engine can infer that events for particular products and brands have occurred and the nature of such events. For example, by solely considering the listed prices of products, the AI engine can determine that a particular event occurred which included the sale of a certain products of a brand during the month of March of 2016.

As another example, the machine learning models can use tokenization (e.g. word segmentation) and keyword matching to identify mentions of words indicative of a sale to preprocess the event data, In addition, plain keyword matching techniques, such as word-stemming and lemmatization can be used so that different inflections of a word are matched (e.g. sales, sold, and sale). In addition, the machine learning models can preprocess event data originating from user messages 201, or user activity data 202 by using sentiment analysis, to ensure that the sale event referenced in such user messages 201, or user activity data 202 was done so in a positive context. Tokenization and keyword matching may also be used to identify the brand associated with a particular sale, using word-stemming and lemmatization for better hit rates.

After the event data 207 is preprocessed, the AI engine will format to the processed event data, so that the preprocessed data uniformly indicates the time, duration, and type of events which have occurred for a plurality of particular products, and brands over a period of time.

At step 305 and 306 in FIG. 3B the processed event data can then be used as training data by various machine learning models in order to make predictions of when future events for sales of particular products or brands will occur, the duration of the predicted sale, the type of predicted sale, and a confidence score indicating the confidence in the occurrence of the predicted sale. The processed event data can organized by brand, or by product before the machine learning models process the event data.

The machine learning models used by the AI engine can also consider the following exemplary inputs derived from the event data 207 when making predictions for future events: the frequency in which the particular product has been offered on sale in the past, such as whether the period of time of an event in which a product has been offered for sale (such as the summer, or a particular week or day of the year); the frequency that such events have occurred; the duration of such events (for example, the how long the product was on sale during a brand's summer sale in previous years); the duration of events in which more than one product from a particular brand have been offered for sale in the past, and the number and nature of such products offered for sale at the events; the time period between similar events.

The machine learning model can also analyze event data for sales of competing entities, including competing products and/or competing brands of the products, and the nature, duration, frequency, and other characteristics of such competing events, such as how recently similar events have occurred for competing products and/or brands, and how likely a particular brand is to copy events of its competitors based on historical event data. By analyzing processed event data of competing entities associated with similar events for different products and/or brands, the AI engine may more accurately predict future events. Such methodology assumes that events for a particular brand are influenced by occurrence of competitor events. Such an assumption can be back tested using historical event data by the AI engine.

Exemplary embodiments utilize machine learning models that apply cluster analysis to accurately predict events for upcoming events or discount of particular brands or products as illustrated in step 303 in FIG. 3B. Cluster analysis can be implemented by the AI engine by organizing the processed event data into "clusters" of events, so that events pertaining to the same, or similar product, events pertaining to the same or similar brand, and/or events of the same or similar other characteristics are mapped on a timeline. The AI engine can thereafter utilize an optimization algorithm to determine predicted future events. Where such future events fall on the predicted future timeline is a product cluster analysis, and or other machine learning techniques, performed by the AI engine.

The AI engine can assign a value based on historical event data pertaining to the correlation of the occurrence of events for sales offered by competing brands, or for the events of sales of competing and/or similar products. The value can be used by the AI engine to determine a confidence score indicative of the confidence that the AI engine has determined future events to occur. Various optimization algorithms can be used in such a cluster analysis as will be apparent to one of ordinary skill in the art.

In alternative embodiments a supervised machine learning model can be used to accurately predict when an event will occur as illustrated in step 305 in FIG. 3B. The machine learning algorithm can also use an optimization algorithm with unknown parameters that are solved for by iteration using a supervised machine learning model.

The machine learning models in steps 304 and 305 can be retrained upon the collection of additional event data. This will advantageously enable the generation of more accurate predictions, as the training data set will be more robust.

At step 306 the AI engine after the AI engine has generated event predictions from steps 305 and 306, the event predictions are stored in memory or storage of the system. The event predications can advantageously be generated and stored well ahead of when a user can be provided with such event predictions, so that when the AI engine determines it is an appropriate to transmit certain event predictions to a user, it can do so without having to run the relatively computational heavy machine learning algorithms described herein.

The AI engine may determine to present one or more event predictions to a user based on the user profile of the user, and the specific event predictions saved and stored in the memory or storage of the system. The AI engine may transmit events pertaining to any predicted event it generates above a threshold level confidence level score to a user whenever such an event prediction is generated. Alternatively, the AI engine may transmit a certain number of event predictions pertaining to preferred brands and/or products indicated by a user's user profile on a regular interval (e.g. every week, or every month).

The event predictions can be presented to the user in a graphical user interface of the user's user device. For example the user can be presented with a calendar showing predicted upcoming events associated with particular brands or products, which, as indicated by the user's user profile, the user has a preference for receiving. The AI engine may cause to be transmitted a link to the user's email or through a text to the user, which, when selected redirects the user to a website displaying the event prediction calendar. Alternatively, a user may receive a notification to an application which, when opened, leads the user to a display of the event prediction calendar. As another example, the user may, on its own volition, navigation to a website or a URL, which displays event prediction calendars. A website or application may also allow a user to access a plurality of event prediction calendars. The user may be able to navigate to a plurality of different calendars, each displaying different event predictions, even to events pertaining to brands and products that the user's user profile does not indicate the user has a preference to.

The calendar show the predicted future events for sales for particular brands and products. In such a case, the user's user profile can indicate that the user does not have a particular preference for a specific brand, but has a strong preference for a specific type of product. The calendar displayed on the graphical user interface of the user's user device can also indicate the predicted duration of the event, the magnitude or type of the event (e.g. 20% off or buy one get one free sale), and/or the confidence score indicative of a likelihood of an occurrence of a predicted event determined by the AI engine. More than one predicted event can be displayed on the calendar.

Event predictions can be emailed to a customer, or a customer can access such predictions in an application or website of a service provider who generates the event predictions.

Figure 4:
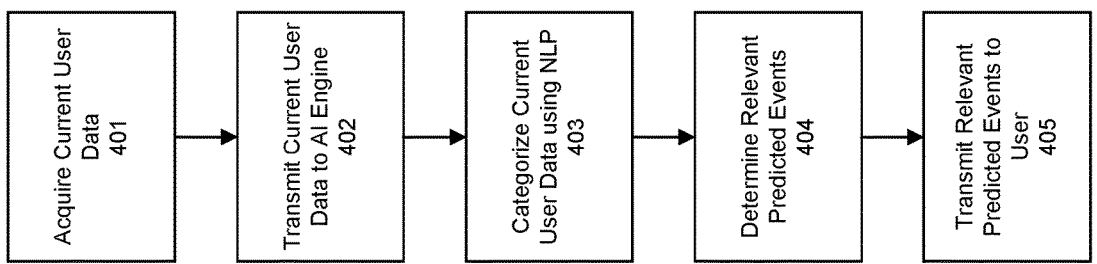
FIG. 4 is a block diagram illustrating an exemplary process for monitoring a user's activity and selectively providing event predictions based thereon.

Alternatively the scraping module, or another type of software program running on the user's user device, can display upcoming event predictions to a user on a graphical user interface display of a user's user' device based on the user's current activity on their user device. Such a method is illustrated in FIG. 4, which depicts a block diagram illustrating an exemplary process for monitoring a user's current activity, and providing predicted events based thereon in the AI system. FIG. 4 may reference the same or similar components, and data as the system 100 in FIG. 1A, the AI-based system in FIG. 1B, the processes illustrated in FIGS. 3A, and 3B, the sequence diagram in FIG. 5, and/or the data, data sources, and transformed data illustrated in FIG. 2.

According to the method illustrated in FIG. 4, at step 401 a scraping module can, for example, monitor the webpages a user visits, the search terms a user inputs into a search engine, applications the user interacts with, or hyperlinks a user selects, in order to determine whether a user is interested in a particular product or brand. The scraping module can monitor the current activity of a user in real time.

At step 402, the scraping module can transmit, in real time, data indicating the user's current activity to the AI engine or the like residing on the server of the event prediction service provider. The AI engine may alternatively periodically make API calls to the scraping module on the user's user device to monitor a user's current activity.

A step 403, the AI engine can determine whether the current activity of the user relates to any stored event predictions, and/or relates to preferred brands or products indicated in the user's user profile. The AI engine can use machine learning techniques, including NLP methodologies to categorize the current activity of the user. For example, if the user is browsing a webpage that includes more than a threshold number of usages of the airline, flight, or location related terms (e.g. "flight" and "Miami"), the AI engine can determine that the current activity of the user indicates the user has a preference for event predictions of certain airlines that have flights to Miami.

Once the AI engine categorizes the user's current activity, the AI engine can then determine if there are any predicted events, which relate to the current activity in step 404 of FIG. 4. The AI engine can also take into consideration user identification information 204 in its decision of whether to present predicted events to the user. User identification information 204 can include, for example, the user's income, credit score, current location, and home address and other personal information relating to the user's ability to purchase a particular item or preference for a particular event. For example, the AI engine can only present predicted events pertaining to particular products or brands if the predicted events pertains to the sale of products or brands that are within the price range of the particular user. The AI engine can consider a user's user profile to determine whether a user has an already defined preference for an event related to a detected current activity data. The AI engine can for example, update the user's user profile if the user profile does not indicate whether or not the user has a particular preference for an event associated with the user preference data 206.

At step 405, if it is determined by the AI engine to provide a predicted event, the predicted event is caused to be transmitted to the user's user device. The scraping module can cause a prompt to be displayed on a portion of a graphical user interface display of a user's user' device. The prompt can include text or other graphics which inform the user to "click here" if the user is interested in a predicted event (which the AI engine has determined relates to the current activity of the user). The prompt can also ask whether the user is interested in seeing other predicted events for similar products or similar brands. If the user selects the prompt, the scraping module can redirect the user to a page showing predicted upcoming events which are associated with the content the user was interacting with. The calendar can include information regarding similar predicted events for competing products or brands.

As an example, if a user is browsing flights on a website of a particular airline, the scraping module can cause the user's user device to display in a graphical user interface display of a user's user' device a prompt asking the user if he or she is interested in seeing predicted events for discounted sales for air flights on that particular airline. If the user selects the prompt, the scraping module can redirect the user to a page showing predicted events for discounted flights from that airline. The calendar may also display predicted events for discounted sales prices for different airlines that fly to similar locations, and also events for discounted rates for hotels, for rental cars and/or other forms of travel which the AI engine has determined is substantially related to the user's current activity (of browsing flights on a website of a particular airline) and/or preferences indicated in the user's user profile. If for example, the user's user profile indicates that the user prefers only to stay in a certain brand of hotels, the AI engine may adventurously only display events pertaining to the particular brand of hotel. The page can be in the form of a calendar, and can indicate when such predicted events for flight discounts will take place, the duration of the predicted event, characteristics of the predicted event (e.g. 20% off, or free carry on included with the flight), and/or the confidence in which the AI engine has determined that such a predicted event will occur.

Other forms of transmitting information relating to predicted events is within the scope of the invention, including transmitting text and email communications including text and/or other graphics indicating predicted events, and displaying advertisements on webpages and applications indicating predicted events.

Figure 5:
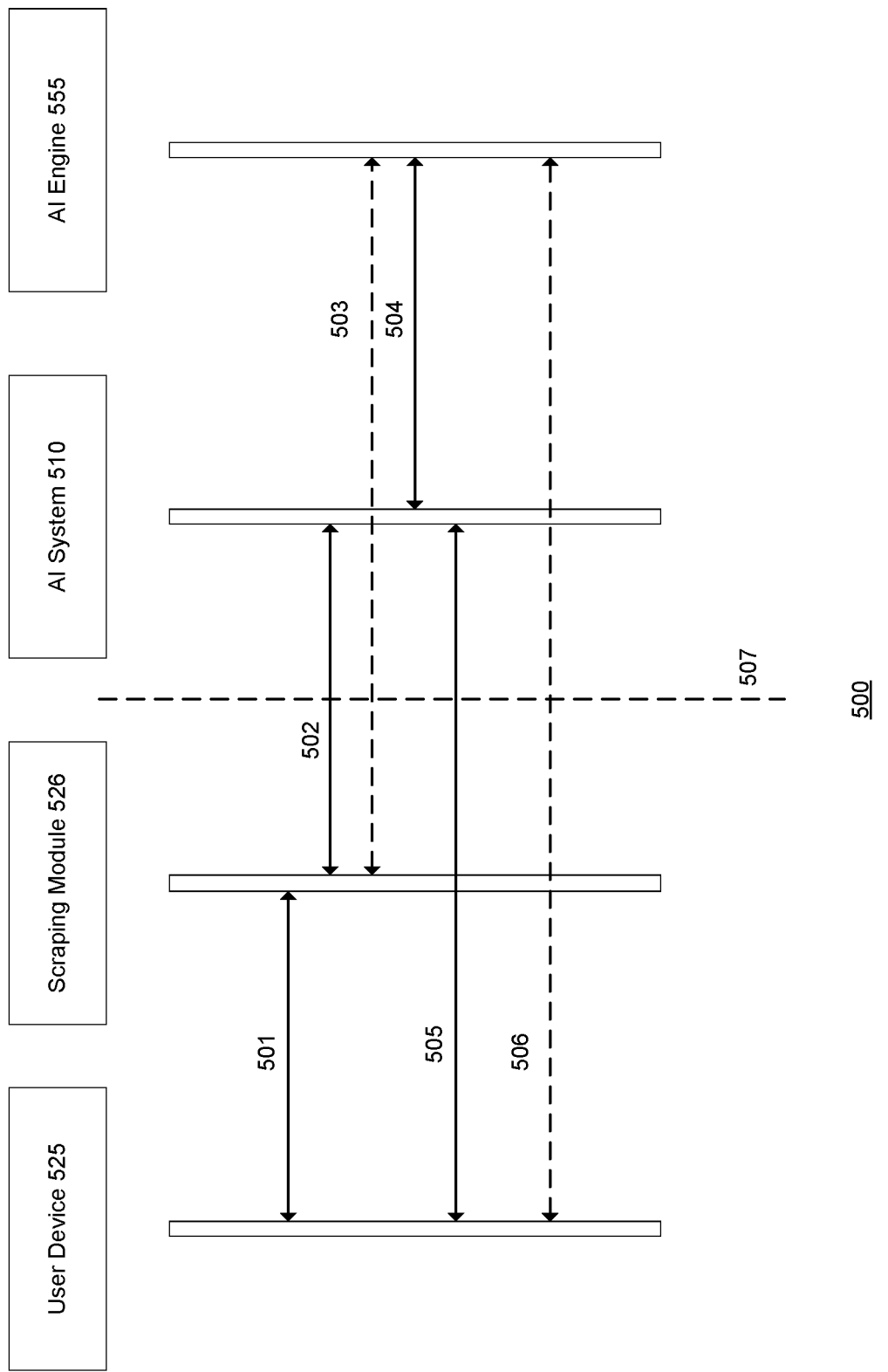
FIG. 5 illustrates a sequence diagram 500 according to an exemplary embodiment.

FIG. 5 illustrates a sequence diagram 500 according to an exemplary embodiment. FIG. 5 may reference the same or similar components, and data as the system 100 in FIG. 1A, the AI-based system in FIG. 1B, the processes illustrated in FIGS. 3A, 3B, and 4, and/or the data, data sources, and transformed data illustrated in FIG. 2. The sequence diagram 500 may include a user device 525, scraping module 526, AI system 510, and AI engine 155. The scraping module 526 can be a software application operating on user device 525, and AI engine can be a software application operating on AI system 510. User device 525, and AI system 510 can have additional software and hardware components not illustrated in FIG. 5, such as those described in connection with FIGS. 1A and 1B. Network 507 operably connects user device 525 and AI system 510.

In sequence step 501, scraping module 526 may be configured to retrieve user messages, user activity data, and transaction data from other applications running on user device, such as a browsing application an email application, and a mobile banking application. Scraping module 526 may receive inputs from user device 525, including permissions for scraping module to scrape and monitor the user's activity on certain applications operating on user device 525.

In sequence step 502, scraping module 526 can transmit to AI system 510 via network 507, user messages, user activity data, and transaction data collected from other applications running on user device 525. AI system can also request such data from the scraping module 526 via API calls, and the like, over network 507. Alternatively, such communications between the scraping module 526 and AI system 510 can occur via communications between scraping module 526 and AI engine 555, directly, as illustrated in sequence step 503.

In sequence step 504, AI engine may access various forms of data used for event prediction and other processes described herein from memory or other components in AI system 510, such as event data, and user preference data. Such data may be stored in storage in AI system 510, or the AI System 5100 may enable AI engine 555 to retrieve such from an external database or server via network 507. AI engine 555 may transmit to the AI system 510 generated event predictions and user profiles for storage in memory, or for storage in a database or server via network 507.

In sequence step 505 AI system 510 may transmit even predictions generated by AI engine 155 determined to be relevant to the user of user device 525. User device may also transmit certain data to AI system, such as user identification information 204, when the user initially signs up for an event prediction service. Alternatively, such communications between the user device 525 and AI system 510 can occur via communications between user device 525 and AI engine 155, directly, as illustrated in sequence step 506.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

What is claimed is:

1. An artificial intelligence (AI)-based system for event predication, comprising:
   a data storage containing event data, user messages, user activity data, user identification information, and transaction data;
   a communication interface in data communication with the data storage;
   an AI engine in data communication with the data storage and coupled to an application programming interface (API) that enables transmission of data through the communication interface; and
   a natural language processing (NLP) module in data communication with the AI engine;
   wherein the AI engine is configured to:
      receive, from the data storage, the user identification information, the user messages, the event data, the user activity data, and transaction data;
      scrape webpages for additional event data;
      apply the NLP module to process the event data;
      construct user preference data from the user messages, the user activity data, the user identification information and the transaction data;
      construct a user profile from user preferences from a plurality of users;
      construct a training data set using the processed event data;

train a predictive model using the training data set to determine at least one event prediction;

determine to display the at least one event prediction based on the user profile;

if it is determined to display the at least one event prediction, generate a graphical user interface display with a calendar depicting the at least one event prediction; and present the graphical user interface display on a device of the user.

2. The AI-based system of claim 1, wherein the user messages contain at least one selected from a group of sale dates, sale amounts, discounts, and brand names.

3. The AI-based system of claim 1, wherein the user activity data contain one of merchant names and product names.

4. The AI-based system of claim 1, wherein the user activity data is retrieved from a scraper module on the device.

5. The AI-based system of claim 1, the AI engine is configured to:

perform cluster analysis on the processed event data; and determine a confidence score indicative of a likelihood of an occurrence of the at least one event prediction.

6. The AI-based system of claim 1, wherein the predictive model includes at least one selected from a group of a hidden Markov model, a Gaussian mixture model, a pattern matching algorithm, a neural network, a matrix representation, (a vector quantization and decision tree, a supervised learning model, an unsupervised learning model, a semi-supervised learning model, a reinforcement learning model, a self-learning model, and a feature learning model.

7. The AI-based system of claim 1, the AI engine is further configured to analyze event data associated with competing entities.

8. The AI-based system of claim 1, wherein the user profile is constructed with a recommendation engine implementing matrix factorization.

9. The AI-based system of claim 1, wherein the NLP module implements word segmentation, and semantic parsing.

10. The AI-based system of claim 1, wherein the AI engine is further configured to:

provide a scraping module configured to retrieve and store product and brand information from receipts contained in a user's email account, and present the scraping module on the device.

11. An artificial intelligence (AI)-based method for event predication, comprising:

receiving, by an AI engine from a data storage, user messages, user activity data, event data, user identification information and transaction data;

scraping, by the AI engine, webpages for additional event data;

applying, by the AI engine, a natural language processing (NLP) module to process the event data;

constructing, by the AI engine, a training data set using the processed event data;

constructing, by the AI engine, user preferences from the user messages, the user activity data, the user identification information and the transaction data;

constructing a user profile, by the AI engine, from user preferences from a plurality of users;

training, by the AI engine, a predictive model using the training data set to determine at least one event predictions;

determining, by the AI engine, to display the at least one event predictions based on the user profile;

if it is determined to display one of the at least one event predictions, generating, by the AI engine, a graphical user interface display with a calendar depicting the at least one event prediction; and presenting the graphical user interface display on a device of the user.

12. The AI-based method of claim 11, wherein the user messages contain at least one selected from a group of sale dates, sale amounts, discounts, and brand names.

13. The AI-based method of claim 11, wherein the user activity data contain one of merchant names and product names.

14. The AI-based method of claim 11, wherein the user activity data is retrieved from a scraping module.

15. The AI-based method of claim 11, further comprising:

performing cluster analysis on the processed event data; and determining a confidence score indicative of a likelihood of an occurrence of the at least one event prediction.

16. The AI-based method of claim 11, wherein the predictive model includes at least one selected from a group of a hidden Markov model, a Gaussian mixture model, a pattern matching algorithm, a neural network, a matrix representation, (a vector quantization and decision tree, a supervised learning model, an unsupervised learning model, a semi-supervised learning model, a reinforcement learning model, a self-learning model, and a feature learning model.

17. The AI-based method of claim 11, further comprising, analyzing, by the AI engine, the event data associated with competing entities.

18. The AI-based method of claim 11, wherein the user profile is constructed with a recommendation engine implementing matrix factorization.

19. The AI-based method of claim 11, wherein the NLP module implements word segmentation, and semantic parsing.

20. A non-transitory computer-accessible medium having stored thereon computer-executable instructions for event predication, wherein a computer arrangement comprises an artificial intelligence (AI) engine and is configured to perform procedures comprising:

receiving, by an AI engine from a data storage, user messages, user activity data, event data, user identification information and transaction data;

scraping, by the AI engine, webpages for additional event data;

apply, by the AI engine, a natural language processing (NLP) module to process the event data;

constructing, by the AI engine, a training data set using the processed event data;

constructing, by the AI engine, user preference data from the user messages, the user activity data, user identification information, and the transaction data;

constructing a user profile, by the AI engine, from user preferences from a plurality of users;

training, by the AI engine, a predictive model using the training data set to determine at least one event prediction;

determining, by the AI engine, to display the at least one event prediction based on the user profile;

if it is determined to display the at least one event prediction, generating, by the AI engine, a graphical user interface display with a calendar depicting the at least one event prediction; and presenting the graphical user interface display in a device of the user;

wherein:
    the AI engine is in data communication with the data storage through a communication interface;
    the AI engine is coupled to an application programming interface (API) that enables transmission of data through the communication interface; and
    the NLP module is in data communication with the AI engine.

* * * * *